April 21, 1931.　　　T. METCALFE　　　1,801,359
INTERMITTENT DRIVE
Filed Oct. 26, 1928
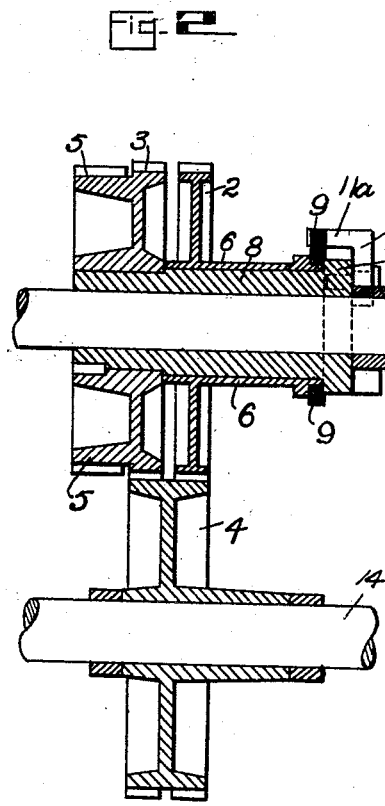
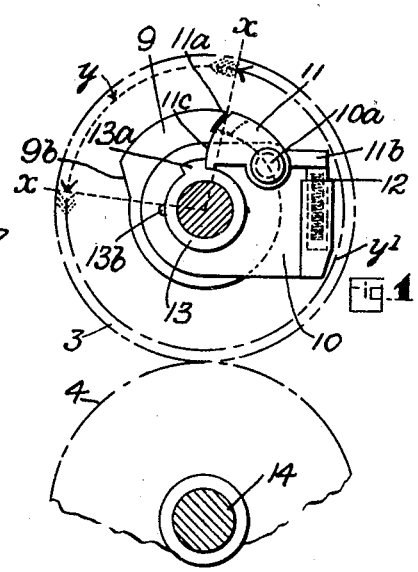
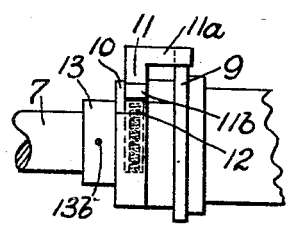
INVENTOR:
Thomas Metcalfe
BY
ATTYS.

Patented Apr. 21, 1931

1,801,359

UNITED STATES PATENT OFFICE

THOMAS METCALFE, OF BIRKBY, HUDDERSFIELD, ENGLAND, ASSIGNOR OF ONE-THIRD TO HOPKINSONS LIMITED, AND ONE-THIRD TO ROBERT ADDY HOPKINSON, BOTH OF BRITANNIA WORKS, BIRKBY, HUDDERSFIELD, ENGLAND

INTERMITTENT DRIVE

Application filed October 26, 1928, Serial No. 315,169, and in Great Britain October 28, 1927.

This invention consists in the production of mechanical devices whereby rotary motion may at any prearranged time be made to engage and transmit intermittent motion (either rotary or reciprocatory for many and varied purposes) to bring into use metal cutting and shaping tools for carrying out the several operations necessary for the production of many articles. The said mechanical movement for controlling the actions of the cutting tools and other parts as stated, may be applied for example to the production of blanks or disc of metal that have to be formed into toothed wheels. This is effected by said mechanism controlling the cutting tools for carrying out (a) the turning and preparing of the peripheral surface of the disc as well as the side surface of same, (b) the boring of the hub of said disc ready for fixing upon the shaft and (c) the cutting of the key-way in said disc, all of which actions are carried out in stages under the control of the mechanical devices referred to. Or if the hole through the hub is required to have a screw thread formed through it, another of my mechanical movements might be employed for controlling the carrying out of the said screw thread cutting or tapping actions.

In the accompanying sheets of drawings which illustrate my invention:—

Fig. 1 is a sectional elevation showing the devices forming my new mechanical movement.

Fig. 2 is a longitudinal sectional elevation of the parts shown by Fig. 1 as seen looking from left to right of said figure.

Fig. 3 is an elevation of the parts shown by Fig. 1 as seen looking from right to left of said figure.

In the production of my mechanical movement I make use of toothed gearing wheels 2 and 3 which are used in pairs and are mounted in positions on a shaft 7 so that both of them may mesh or gear with a toothed driving wheel 4 which is mounted to run loosely upon another shaft 14 as is hereinafter described. The toothed wheel 3 has adjoining it (and preferably formed integrally with it or fixed to it) another wheel 5 which receives its motion from the main driving shaft of the machine. The wheel 2 is fixed upon a sleeve or hub 6 which revolves loosely upon the sleeve 8 while this latter runs loosely upon the shaft 7. The wheel 5 is keyed to the sleeve 8 so that when the wheel 5 revolves it will rotate the wheel 4 so that this wheel 4 will cause the wheel 2 and its hub 6 to rotate.

Adjustably fixed upon the sleeve or hub 6 is a notched disc 9 and adjoining the notched disc 9 is a flange 10 (formed integrally with the sleeve 8) which has pivoted upon it at 10a an engaging pawl 11. This pawl 11 has an extension 11a reaching from it so that it will overhang the notched disc 9 for the purpose hereinafter described, while the rear end 11b of said pawl 11 is actuated by a spring 12 mounted within an appropriate receptacle formed on an extension from the flange 10.

On the other side of and adjoining the flange 10 is a hub 13 having a radially projecting member 13a which is for engagement with the end of the pawl 11 as is shown by Fig. 1.

This hub 13 is fixed upon the shaft 7 (such as by a pin 13b passing through it and through the said shaft 7) in order that as said hub 13 is revolved the shaft 7 will be revolved.

During the operations of the machine to which my said improved devices are applied, the compound wheels 5, 3 revolves continuously and therefore imparts motion in like manner to the wheels 4 and 2. Further according to my invention, the wheel 2 or the wheel 3 may have one or two more teeth than has the other although in order to simplify computation I prefer to use wheels having only the variation of one tooth in their respective number of teeth. For example I arrange the wheel 2 to have one tooth less in number than has the wheel 3 by which means when the wheel 4 revolves or transmits rotary motion to the wheel 2 said wheel 2 will complete one revolution more than the wheel 3 in the time that the ratio of said tooth permits. That is to say, provided the wheel 3 has one hundred and forty four teeth and the wheel 2 has one hundred and forty three teeth, when the wheel 2 has completed one hundred and forty four revolutions the wheel 3 will have completed one hundred and forty three revolutions. Again I may have the engaging wheel 4 to have two sets of teeth, one set meshing with those of the wheel 3 while the other set meshes with the wheel 2, and in this case, instead of varying the number of teeth in the wheels 3 and 2, said wheels have an equal number of teeth (say one hundred and forty four) and I vary the number of teeth in the wheel 4 by making those teeth in said wheel 4 which mesh with the wheel 3, to be one hundred and forty four in number (agreeing with the number of teeth in the wheels 3 and 2) while those gearing with the wheel 2 are one hundred and forty five in number. To enable the addition of one tooth to the part of the wheel 4 which meshes with the wheel 2 while still retaining the wheels 3 and 2 to revolve about a common axis, with the wheel 4 having its two parts both revolving about another axis which is parallel thereto, the part which carries the extra tooth may be arranged to take slightly deeper into gear with its wheel 2 to allow for its slightly increased diameter.

By arranging the wheel 3 and that part of the wheel 4 which gears with it to have coarser pitch teeth, each of them might have seventy two teeth instead of one hundred and forty four.

Further than this the number of teeth in each wheel may be varied relatively with those of the other wheels to attain alterations that may be required in any given circumstances.

By the employment of the wheels arranged as above described the wheel 2 will carry its sleeve 6 and therefore the notched disc 9 which is fixed to it, at a quicker rate than the wheel 3 and during said revolutions it will have brought the notched disc 9 so that its notch at 9a will have permitted the overhanging part 11a of the pawl 11 to descend under the actions of the spring 12 into the position shown by Fig. 1. And as this pawl 11 is carried by the member 10 the end of the pawl at 11c will engage a projection 13a on the hub 13 consequently the motions of the pawl 11 will be transmitted to the hub 13 and therefore to the shaft 7.

This motion of the shaft 7 which is effected by the hub 13, is at a slower rate than is the motion of the disc 9 and so enables said disc 9 to over-run the flange 10 carrying the pawl 11 by which means the inclined part 9b finally disengages the pawl 11 from the projection 13a by means of the cam surface 9b on the notched disc 9 raising the pawl 11 (which is effected by its extending portion 11a sliding over the cam surface 9b) thus the period of engagement of the pawl 11 with the hub 13 as well as its period of disengagement are controlled by the relative movements of the wheels 2 and 3 and the relative spaces between the parts $x$ and $x^1$ (Fig. 1) as shown by arrow $y$ and $x^1$ and $x$ shown by arrow $y^1$ on the periphery of the disc 9 where the pawl 11 is respectively held out of gear and allowed to remain in gear with the member 13a. By these means any desired duration of inaction or active work as may be found to be required of the cutting tools or other devices can be secured by the controlling mechanism described.

I may observe that although the wheels 2, 3 and 4 are arranged so that the disc 9 is moved at a higher speed than is the disc 10 carrying the pawl 11 in order that the former should enable the latter to come automatically into action, I might reverse the direction of motion and then arrange the disc 10 to move quicker than the disc 9 in order that the former might carry its pawl 11 beyond the notch in the former to secure the controlling actions.

Such being the nature and object of my said invention what I claim is:—

In an intermittent drive comprising a shaft, an inner and outer sleeve supported upon the shaft, means for driving the sleeves at different rates of speed, a hub secured to the shaft, a radial projection on the hub, a pawl carrier secured to one sleeve, a spring pressed pawl pivoted on the carrier having its free end adapted to lie in the path of the hub projection, and a cam adjustably carried by the other sleeve with which the pawl also coacts to carry it out of the path of the projection at any predetermined point.

THOMAS METCALFE.